(12) United States Patent
VanLaningham et al.

(10) Patent No.: US 7,961,147 B1
(45) Date of Patent: Jun. 14, 2011

(54) LONG BASELINE PHASE INTERFEROMETER AMBIGUITY RESOLUTION USING FREQUENCY DIFFERENCES

(75) Inventors: Steven VanLaningham, Richardson, TX (US); James A. Stevens, Lucas, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 362 days.

(21) Appl. No.: 12/220,600

(22) Filed: Jul. 25, 2008

(51) Int. Cl.
*G01S 1/38* (2006.01)
*G01S 5/02* (2010.01)
(52) U.S. Cl. .......... 342/424; 342/442; 342/444
(58) Field of Classification Search .......... 342/442
See application file for complete search history.

(56) References Cited

U.S. PATENT DOCUMENTS

| 5,477,230 A * | 12/1995 | Tsui | 342/442 |
| 5,708,443 A * | 1/1998 | Rose | 342/442 |
| 6,700,536 B1 * | 3/2004 | Wiegand | 342/417 |
| 6,791,493 B1 * | 9/2004 | Rose | 342/442 |

* cited by examiner

*Primary Examiner* — Gregory C Issing
(74) *Attorney, Agent, or Firm* — Matthew J. Evans; Daniel M. Barbieri

(57) ABSTRACT

A method for determining an angle-of-arrival for a detected signal. The method includes the steps of receiving the signal at a first antenna, receiving the signal at a second antenna, generating a plurality of spectral lines based on a complex multiplication of a complex conjugation of the signal received at the first antenna and the signal received at the second antenna, generating a delta phase difference for pairs of the spectral lines using frequency differences, and generating an angle-of-arrival for the detected signal based on an average of the delta phase difference.

20 Claims, 4 Drawing Sheets

LONG BASELINE PHASE INTERFEROMETER AMBIGUITY RESOLUTION USING FREQUENCY DIFFERENCES

BACKGROUND

The present invention relates generally to the field of systems and methods for determining an angle-of-arrival for a detected signal. More particularly, the present invention relates to a system and method for resolving phase ambiguity of a long baseline phase interferometer using weighted unambiguous frequency differences in the detected signal.

Phase interferometry is the technique of using patterns of interference created by the superposition of two or more waves to diagnose the properties of the aforementioned waves. A phase interferometer may be used to provide precise angle-of-arrival information for radio frequency (RF) signals of interest. Phase interferometry has historical application in SIGINT and COMINT.

SIGINT is intelligence-gathering by interception of signals, whether between people (i.e., COMINT or communications intelligence) or between machines (i.e., ELINT or electronic intelligence), or mixtures of the two. Communications intelligence (COMINT) is a sub-category of signals intelligence that engages in dealing with messages or voice information derived from the interception of foreign communications. Electronic signals intelligence (ELINT) is intelligence gathering by use of electronic sensors.

The data that is available from SIGINT may reveal information about an opponent's defense network, especially the electronic parts such as radars, surface-to-air missile systems, aircraft, etc. SIGINT can be used to detect ships and aircraft by their radar and other electromagnetic radiation. SIGINT can be collected from ground stations near the opponent's territory, ships off their coast, aircraft near or in their airspace, or by satellite.

In addition to the content of signals, SIGINT provides information based on both type of electronic transmission and its originating location. Triangulation and more sophisticated radiolocation techniques, such as time of arrival methods, require multiple receiving points at different locations. These receivers send location-relevant information to a central point, or perhaps to a distributed system in which all participate, such that the information can be correlated and a location computed.

What is needed is a system and method for resolving the phase ambiguity created when using two or more antenna that are widely spaced relative to the wavelength of the signals being measured to provide an accurate direction finding measurement.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

One embodiment of the invention relates to a method of determining an angle-of-arrival for a detected signal. The method includes receiving the signal at a first antenna, receiving the signal at a second antenna, and generating an angle-of-arrival for the detected signal by resolving a phase ambiguity using frequency differences between the signal from the first antenna and the signal from the second antenna.

Another embodiment of the invention relates to a system for determining an angle-of-arrival for a detected signal. The system includes a first radio frequency receiver configured to receive the detected signal at a first antenna, a second radio frequency receiver configured to receive the detected signal at a second antenna, and an interferometer configured to generate an angle-of-arrival value for the detected signal by resolving a phase ambiguity using frequency differences between the signal from the first receiver and the signal from the second receiver.

Yet another embodiment of the invention relates to a method for determining an angle-of-arrival for a detected signal. The method includes the steps of receiving the signal at a first antenna, receiving the signal at a second antenna, generating a plurality of spectral lines based on a complex multiplication of a complex conjugation of the signal received at the first antenna and the signal received at the second antenna, generating a delta phase difference for pairs of the spectral lines using frequency differences, and generating an angle-of-arrival for the detected signal based on an average of the delta phase difference.

Alternative examples and other exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED EMBODIMENTS

Figure 1:
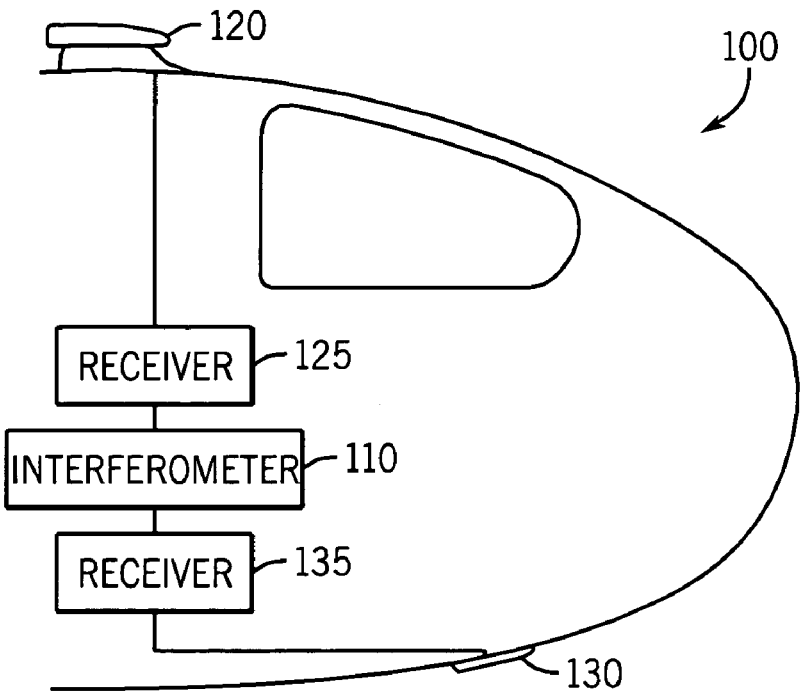
FIG. 1 is an aircraft having an onboard interferometer including first and second antennae, each antenna coupled to an associated receiver, according to an exemplary embodiment.

Before describing in detail the particular improved system and method, it should be observed that the invention includes, but is not limited to, a novel structural combination of conventional data/signal processing components and communications hardware and software, and not in particular detailed configurations thereof. Accordingly, the structure, methods, functions, control, and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring to FIG. 1, an aircraft 100 having an onboard interferometer 110 including first and second antennae 120 and 130, each antenna coupled to an associated receiver 125 and 135, respectively, is shown, according to an exemplary embodiment. Advantageously, using the system described herein, only two antenna and two RF front-end receivers are needed to resolve the phase ambiguity created when the antenna are widely spaced relative to the wavelength of the signals being measured. Although only two antenna and receivers are described, it should be understood that the interferometer direction finding may be performed using multiple antennae using the methods and system described herein.

Since only two antenna and RF front-ends are needed, interferometer 110 uses fewer antennas and less hardware than traditional interferometers, reducing size, weight, power consumption, and cost. Further, interferometer 110 may be implemented in platforms that do not currently have direction finding capability. For example, many aircraft in use today only have top and bottom antenna.

Although shown and described above with reference to a single aircraft, interferometer 110 could also be implemented by multiple aircraft with single antennas forming a networked interferometer between them. Further, although shown according to a specific embodiment, interferometer 110 may alternatively be configured to include more, fewer, and/or different components configured to implement functions described herein.

Figure 2:
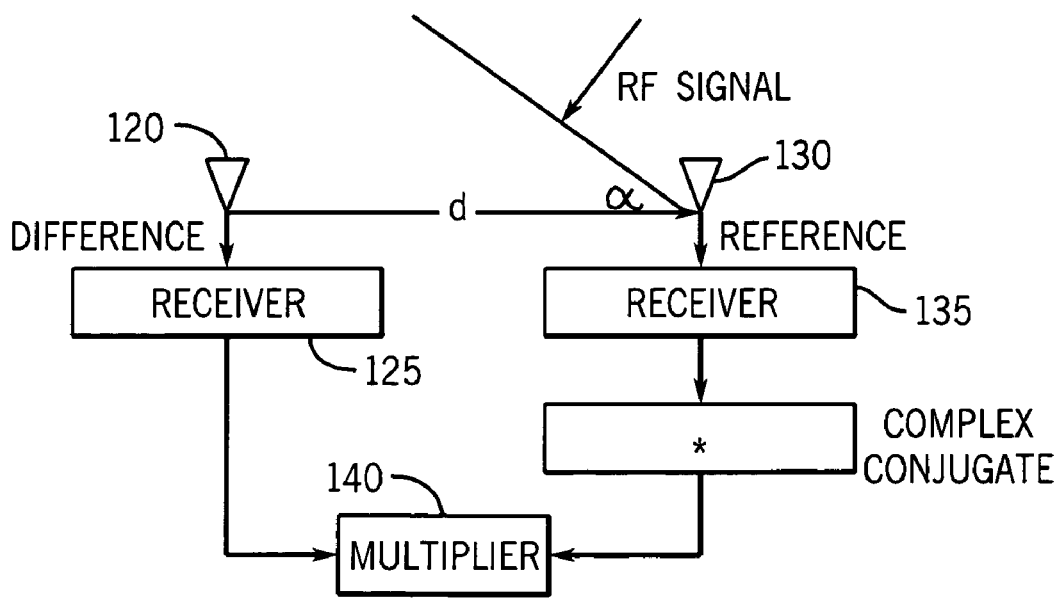
FIG. 2 is the antenna, receivers and a multiplier of the interferometer of FIG. 1 receiving signals from a remote transmission source at an angle-of-arrival of a and the two antenna are separated by interferometer baseline d (representing the distance between the two antenna) shown in schematic form, according to an exemplary embodiment.

Referring now to FIG. 2, antenna 120 and 130, receivers 125 and 135 and a multiplier 140 of interferometer 110 receiving signals from a remote transmission source at an angle-of-arrival of α and the two antenna are separated by interferometer baseline d (representing the distance between the two antenna) are shown in schematic form, according to an exemplary embodiment. Typically, the longer the interferometer baseline, the more accurately the angle-of-arrival can be determined. However, a phase ambiguity can exist when the baseline is longer than half of the wavelength of the signal being measured (for the angle-of-arrival on the interval of ±π/2). Traditionally, this phase ambiguity has required phase interferometers to limit the distance between the antennas to one half of the wavelength of the highest frequency being measured, limiting the accuracy, or use three or more antenna, requiring more than one baseline, to determine unambiguous angle-of-arrival on a longer, more accurate baseline.

Figure 3:
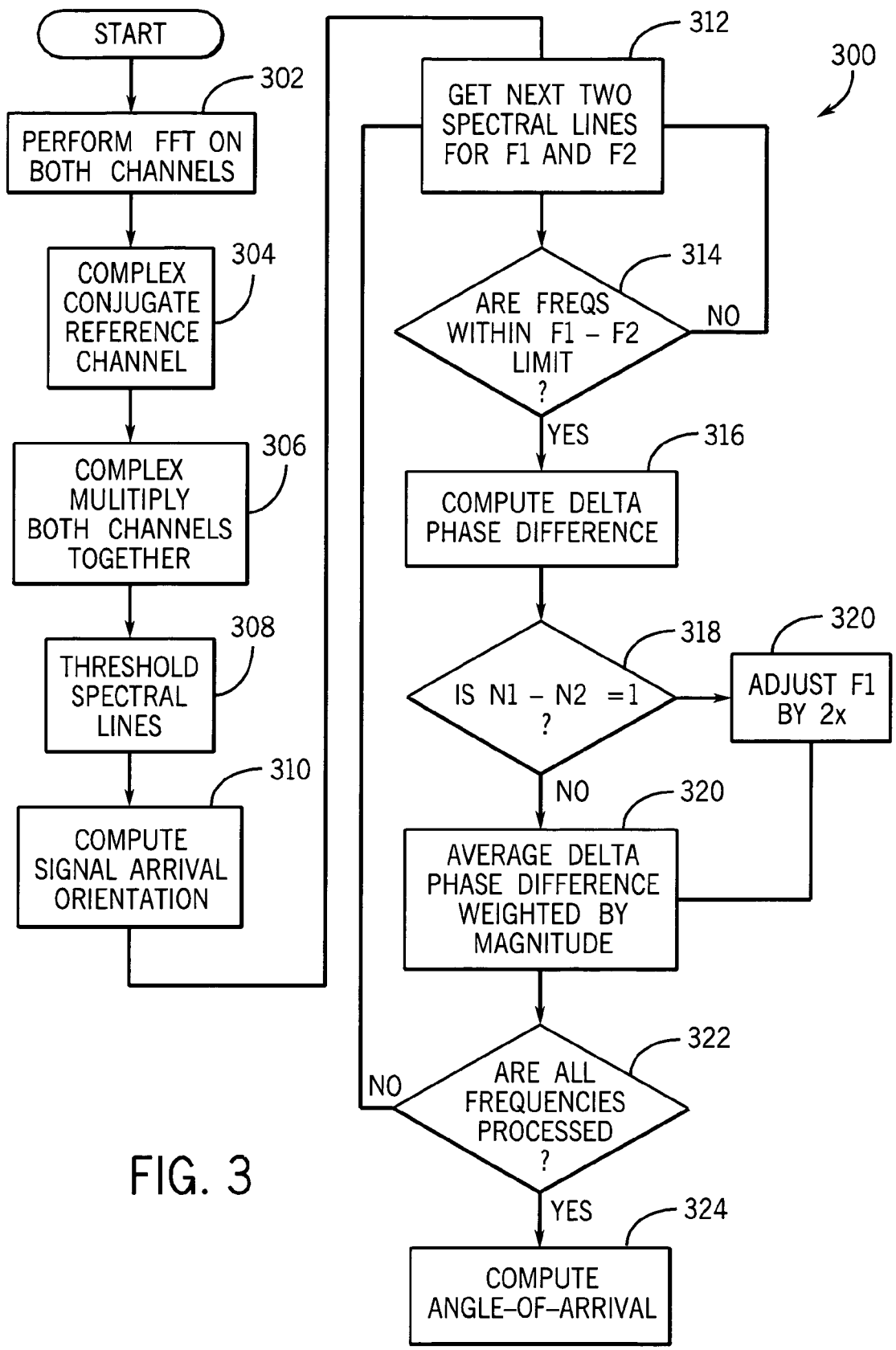
FIG. 3 is a flowchart illustrating a method for using frequency differences to resolve phase ambiguity to determine an angle-of-arrival of a detected signal, according to an exemplary embodiment.

Referring now to FIG. 3, a flowchart 300 illustrating a method for using frequency differences to resolve phase ambiguity to determine an angle-of-arrival of a detected signal is shown, according to an exemplary embodiment. The method of flowchart 300 may be implemented during a signal detection and analysis process. One of ordinary skill in the art would understand that although flowchart 300 is shown and described herein as having a specific number of steps performed in a specific order, the method may be implemented using more, fewer, and/or a different ordering of steps to perform the functions described herein.

In a step 302, signal processing begins by using a Fast Fourier Transform on the incoming signal received and both of antennas 120 and 130 and receivers 125 and 135 to generate the discrete Fourier transform representing the frequency domain of the signal received separately on each antenna. Although described and shown herein as being processed using Fast Fourier transforms, the incoming signal may alternatively be processed used a number of other methods including, but not limited to, delay discriminators, an acousto-optic modulator or Bragg cell, etc.

A first channel may be designated as a reference channel, shown as antenna 130 and receiver 135 in FIG. 2. A second channel may be designated as a difference channel, shown as antenna 120 and receiver 125 in FIG. 2. The signal for the difference channel is given by the equation:

$$SD = A_D e^{j\left(\omega t + N_D 2\pi + 2\pi d \sin\frac{\alpha}{\lambda}\right)} \quad (1)$$

Although antenna 120 and receiver 125 are shown and described herein as the difference channel and antenna 130 and receiver 135 as the reference channel, it should be understood that these designation may be reversed dependent on which receiver path contains the complex conjugation. The receiver path containing the complex conjugation is referred to as the reference channel.

The resultant discrete Fourier transform on the reference channel may be transformed by complex conjugation in a step 304 such that the signal from the reference channel is given by the equation:

$$S_R = A_R e^{j(\omega t)} \quad (2)$$

In a step 306, the resultant equation from both channels may be complex multiplied together to generate a magnitude, represented by the equation:

$$S_{RD} = A_R A_D e^{j\left(N_D 2\pi + 2\pi d \sin\frac{\alpha}{\lambda}\right)} \quad (3)$$

and an angle giving the phase, represented by the equation:

$$\angle S_{RD} = \Phi_{RD} = N_D 2\pi + 2\pi d \sin\frac{\alpha}{\lambda} \quad (4)$$

Where in the term $N_D$ in equations 3 and 4 represents the number of times the phase signal has passed through $2\pi$ when passing from the reference channel to the difference channel. This term, as used herein, represents the phase ambiguity.

In a step 308, following the complex multiplication of the reference and difference channels, interferometer 110 may be configured to threshold spectral lines. If Fast Fourier transforms are used to compute the frequency components on each channel, this threshold is applied to each of the frequency bins to eliminate noise and interference from the calculation and to eliminate spectral artifacts induced by the receivers' front end (as well as windowing and filtering in the digital domain).

Figure 4:
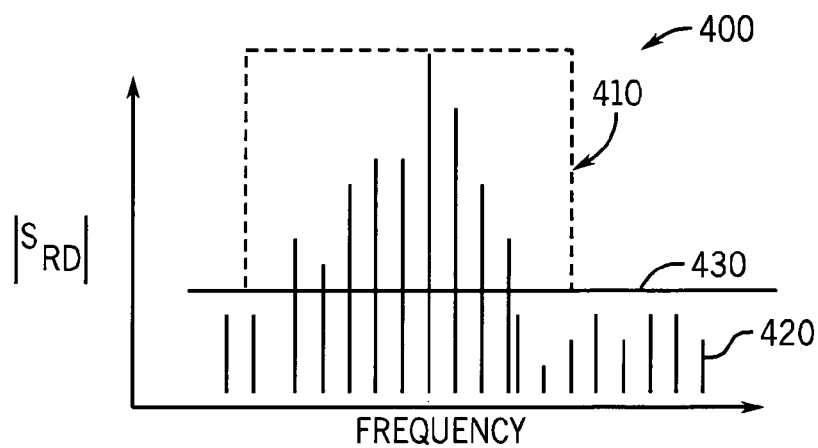
FIG. 4 is a graph illustrating spectral lines for the signal received on the reference channel including both spectral lines that above a threshold and spectral lines that are below a threshold, according to an exemplary embodiment.

Referring now to FIG. 4, a graph 400 illustrating spectral lines for the signal received on the reference channel including both spectral lines 410 that above threshold 430 and spectral lines 420 that are below threshold 420 is shown, according to an exemplary embodiment. The threshold may be computed as a tangential sensitivity relative to the noise floor, as a Constant False Alarm Rate (CFAR), as a function of calibration, etc.

Figure 5:
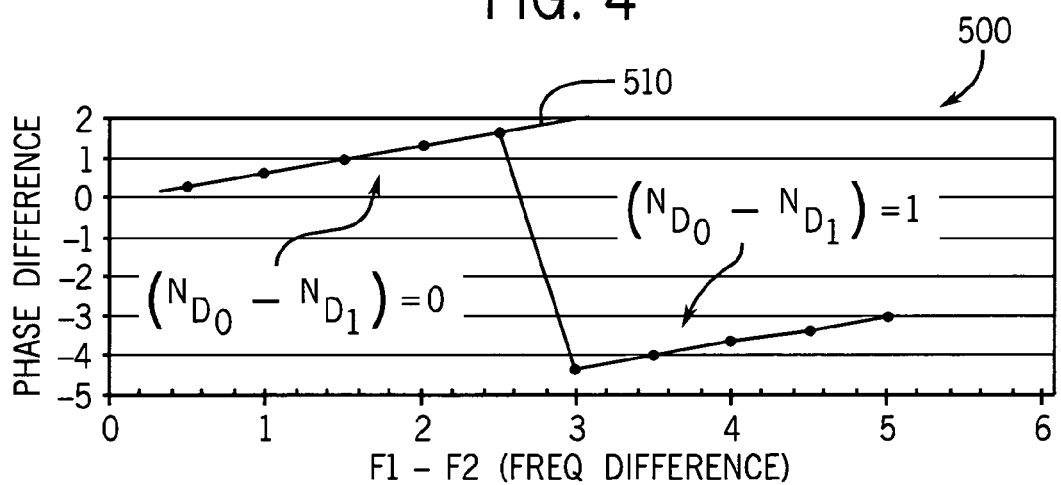
FIG. 5 is a graph illustrating a phase difference for increasing frequency difference for the slope line of the phase difference computed to different frequencies in a first instance, according to an exemplary embodiment.

Referring again to FIG. 3, in a step 310, interferometer 110 is configured to compute a signal arrival orientation. It is desirable to determine a signal arrival orientation for computing the angle-of-arrival, a, and to know how to compensate for instances when the ambiguity difference ($N_{DO}$–$N_{D1}$) is not equal to zero. Two possible signal arrival orientations include an arrival angle that is acute to the baseline from the reference channel antenna 130 and an arrival angle that is obtuse to the baseline from the reference channel antenna 130. In the first instance, the signal wavefront hits the reference antenna 130 first before hitting the difference antenna 120. Referring now to FIG. 5, a graph 500 illustrating a phase difference for increasing frequency difference for the slope line 510 of the phase difference computed to different frequencies in the first instance is shown, according to an exemplary embodiment. As seen in FIG. 5, the slope of slope line 510 is positive. The slope line 510 is generated based on the equation:

$$\Delta \Phi_{RD_{01}} = 2\pi(N_{D_0} - N_{D_1}) + 2\pi d \sin(\alpha)\left(\frac{1}{\lambda_0} - \frac{1}{\lambda_1}\right) \text{ for } \lambda_0 < \lambda_1 \quad (5)$$

Equation (5) is generated by expanding equation (4) for two frequencies at wavelengths of $\lambda_0$ and $\lambda_1$. The difference of the resultant two equations provides equation (5), referred to hereinafter as the delta phase differencing equation.

Figure 6:
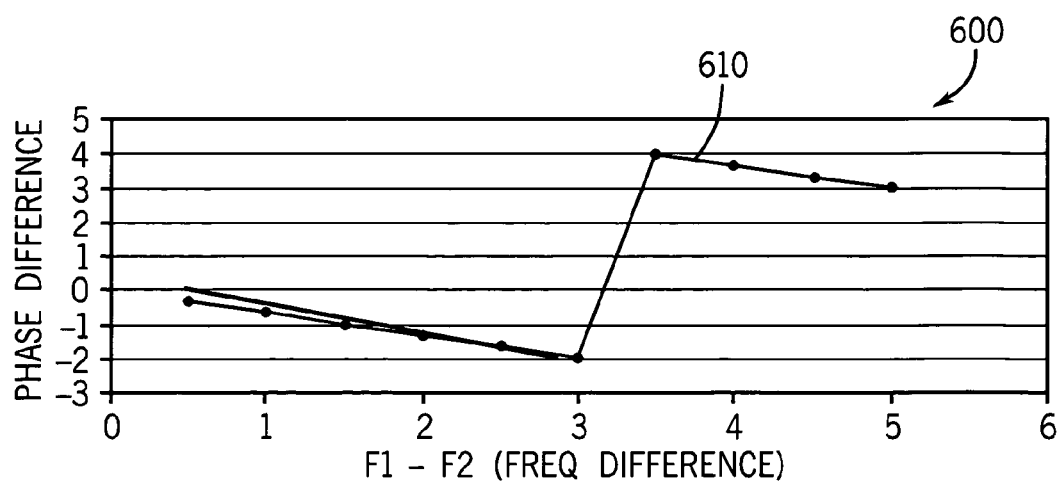
FIG. 6 is a graph illustrating a phase difference for increasing frequency difference for the slope line of the phase difference computed to different frequencies in a second instance, according to an exemplary embodiment.

In the second instance, the signal wavefront hits the difference antenna 120 first. Referring now to FIG. 6, a graph 600 illustrating a phase difference for increasing frequency difference for the slope line 610 of the phase difference computed to different frequencies in the second instance is shown, according to an exemplary embodiment. As seen in FIG. 6, the slope of slope line 610 is negative. The slope line 610 is generated based on the equation:

$$\Delta \Phi_{RD_{01}} = 2\pi(N_{D_1} - N_{D_0}) + 2\pi d \sin(\alpha)\left(\frac{1}{\lambda_1} - \frac{1}{\lambda_0}\right) \text{ for } \lambda_0 < \lambda_1 \quad (6)$$

When the signal wavefront hits the reference antenna 130 first and the difference antenna 120 last, the difference equation (3), increases in the positive direction in phase as the difference ($1/\lambda_1 - 1/\lambda_0$) increases. When the signal wavefront hits the difference antenna 120 first the difference equation (3) increases in the negative direction in phase as the difference ($1/\lambda_1 - 1/\lambda_0$) increases. Determination of the signal arrival orientation may be done by computing the slope of the phase difference computed at two different frequencies.

Referring again to FIG. 5, when the ambiguity difference $N_{DO}$–$N_{D1}$ goes from 0 to 1, the phase difference goes from positive to negative. This switch is caused by the higher frequency phase difference having a $2\pi$ roll-over prior to the phase difference of the lower frequency. When this occurs, interferometer 110 may be configured to add $2\pi$ to the higher frequency phase. Accordingly, the phase difference equation becomes:

$$\Delta \Phi_{RD_{01}} = 2\pi(1 - 0) + 2\pi d \sin(\alpha)\left(\frac{1}{\lambda_0} - \frac{1}{\lambda_1}\right) \quad (7)$$

Referring again to FIG. 3, following computation of the signal arrival orientation, interferometer 110 may be configured to examine a first and a second spectral line in a step 312 to determine in a step 314 whether the spectral lines are within the limit of a frequency constraint for ambiguity resolution. In order to resolve the ambiguity difference $2\pi(N_{DO}-N_{D1})$ of equation (5), the term ($N_{DO}-N_{D1}$) must be equal to 1 or 0 when $\lambda_0$ is smaller than $\lambda_1$ (i.e., Frequency 0, $f_0$ is greater than Frequency 1, $f_1$). This condition is ensured when $\alpha \leq 90$ according to the equation:

$$d\left(\frac{1}{\lambda_0} - \frac{1}{\lambda_1}\right) \leq 1 \quad (8)$$

Alternatively, by substituting $\lambda$ with c/f, where c is the speed of light, the equation may be rewritten to provide the maximum unambiguous frequency difference as a function of the interferometer baseline, d, as:

$$f_0 - f_1 \leq \frac{c}{d} \quad (9)$$

According to another embodiment, the actual electromagnetic propagation velocity may be used in place of the speed of light.

If the spectral lines are not within the limit of a frequency constraint for ambiguity resolution in step 314, step 312 may be repeated to examine the next two spectral lines for first and second frequency. In the spectral lines are within the limit of a frequency constraint for ambiguity resolution, interferometer 110 may compute the delta phase difference using equation (5) in a step 316.

In a step 318, a determination is made whether N1–N2 is equal to 1. If so, in a step 320, Frequency 1, $f_1$, is adjusted by $2\pi$. If not, or following step 320, the average delta phase difference may be weighted by magnitude in a step 322. Once the spectral lines for a signal have been thresholded and selected, they can be processed by weighting the phase difference solution, equation (5) by the corresponding amplitude or signal-to-noise ratio. The leading to be accomplished using a sliding window constrained to f1–f2$\leq$c/d (equation (9)) where the weighted phase difference is computed by the equation:

$$\Phi_{RD_{01}} = \frac{1}{\sum A_i A_k} \sum_{i=0, k=0}^{N-1[i \neq k]} A_i A_k 2\pi(N_{Di} - N_{Dk}) + 2\pi d \sin(\alpha)\left(\frac{1}{\lambda_0} - \frac{1}{\lambda_1}\right) \quad (10)$$

Following step 320, a determination is made in a step 322 whether all frequencies have been processed. If not, processing on the next frequency is performed beginning with step 312.

If all of the frequencies have been processed, an angle-of-arrival is computed in a step 324. Following the complex multiplication of the complex conjugated reference channel with the unconjugated difference channel, a real, $R_s$ and an imaginary $I_s$ part is provided. Depending on the signal arrival orientation, as previously described, the phase may be computed as either $\tan^{-1}(I_s/R_s)$ or $\tan^{-1}(R_s/I_s)$. Once the phase difference is computed for the correct signal arrival orientation, the angle-of-arrival, $\alpha$, may be computed using the equation:

$$\alpha = \sin^{-1}\Phi_{RD}\frac{\overline{\lambda}}{2\pi d} \quad (11)$$

$$\text{where } \overline{\lambda} = \frac{\sum_{i=0}^{N-1}(A_{Di}A_{Ri}\lambda_i)}{\sum_{i=0}^{N-1}A_{Di}A_{Ri}}$$

The angle-of-arrival, α, applies to the angle the signal wavefront makes with the interferometer baseline as well as the angle-of-arrival relative to an interferometer boresight.

Figure 7:
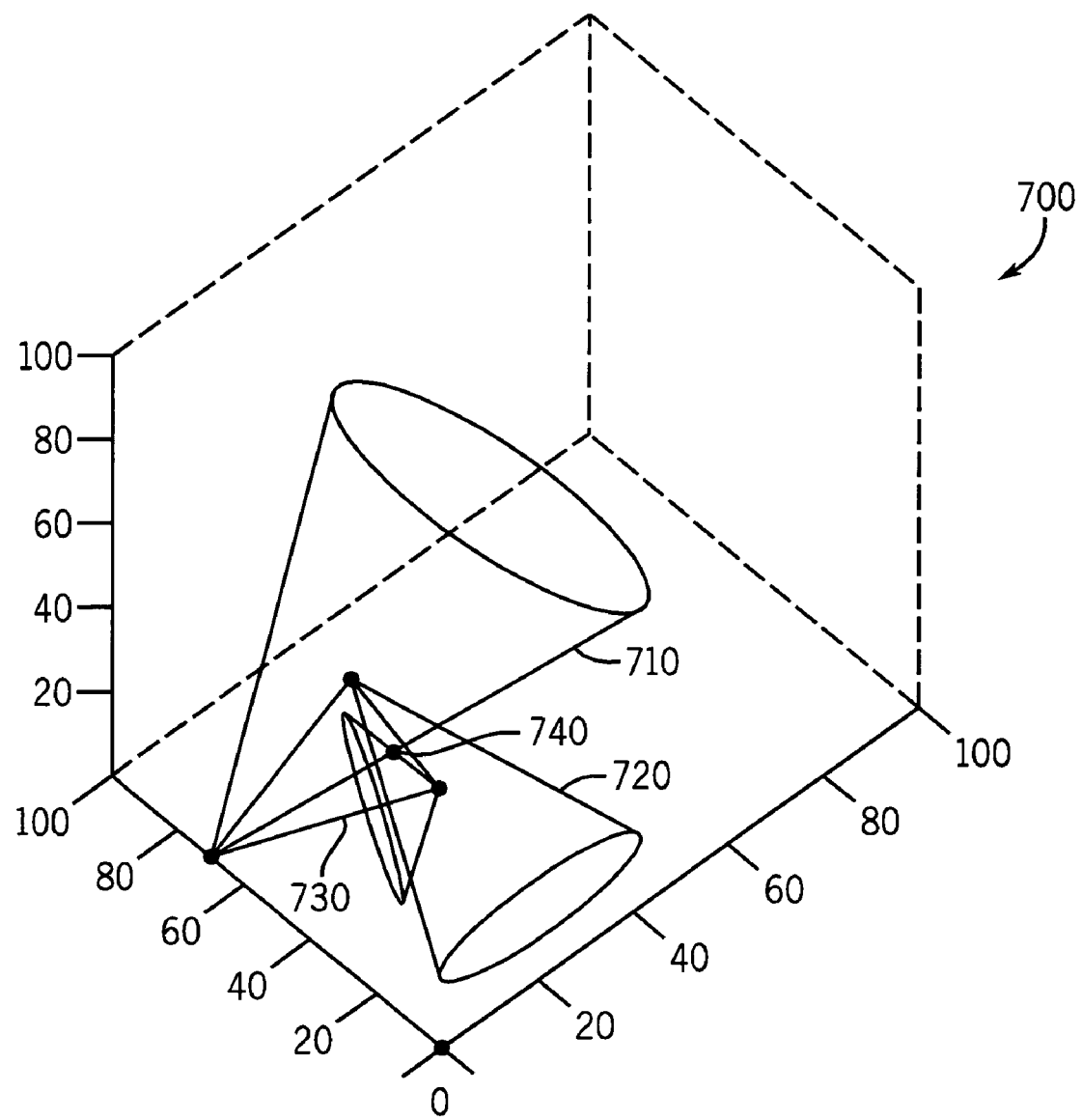
FIG. 7 is a graph illustrating target resolution to a point with uncertainty subject to the accuracy of the measurements, according to an exemplary embodiment.

Referring to FIG. 7, a first graph 700 illustrating target resolution to a point with uncertainty subject to the accuracy of the measurements is shown, according to an exemplary embodiment. Graph 700 illustrates output produced by an interferometer system 110 where an aircraft 100 is using three antennas to resolve a target location to a point in space. A first conical target location determination 710 may be created using first and second antennas 125 and 135. A first second target location determination 720 may be created using first antenna 125 and a third antenna (not shown in drawings). A third conical target location determination 730 may be created using second antenna 135 and the third antenna. Determining an intersect of the three conical target location determinations provides a target location point 740 in three dimensional space.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type and number of antenna us, the method in which frequency difference is used to resolved the phase ambiguity, the position of the antenna, etc. may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of determining an angle-of-arrival for a detected signal, comprising:
    receiving the signal at a first antenna;
    receiving the signal at a second antenna; and
    generating an angle-of-arrival for the detected signal by resolving a phase ambiguity associated with the signal from the first antenna and the signal from the second antenna, wherein the phase ambiguity is resolved by computing an ambiguity difference using a slope of a phase difference between the signal at the first antenna and the signal at the second antenna computed at two distinct frequencies, the slope of the phase difference being with respect to a frequency difference.

2. The method of claim 1, further including designating a first receiver associated with the first antenna as a reference channel and a second receiver associated with the second channel as a difference channel.

3. The method of claim 2, further including multiplying a complex conjugation of the reference channel signal by the difference channel signal.

4. The method of claim 2, further including generating spectral lines at a plurality of frequencies for the signal received on the reference channel.

5. The method of claim 4, further including generating a threshold value to be applied to the spectral lines.

6. The method of claim 5, wherein generating an angle-of-arrival includes determining a signal arrival orientation value.

7. The method of claim 1, further including receiving the signal at a third antenna to determine an emitter point along the angle-of-arrival.

8. A system for determining an angle-of-arrival for a detected signal, comprising:
    a first radio frequency receiver configured to receive the detected signal at a first antenna;
    a second radio frequency receiver configured to receive the detected signal at a second antenna; and
    an interferometer configured to generate an angle-of-arrival value for the detected signal by resolving a phase ambiguity generating an angle-of-arrival for the detected signal by resolving a phase ambiguity associated with the signal from the first receiver and the signal from the second receiver, wherein the phase ambiguity is resolved by computing an ambiguity difference using a slope of a phase difference between the signal at the first receiver and the signal at the receiver computed at least two distinct frequencies, the slope of the phase difference being with respect to a frequency difference.

9. The system of claim 8, wherein the interferometer is configured to designate the first receiver associated with the first antenna as a reference channel and the second receiver associated with the second channel as a difference channel.

10. The system of claim 9, wherein the interferometer is configured to multiply a complex conjugation of the reference channel signal by the difference channel signal.

11. The system of claim 9, wherein the interferometer is configured to generate spectral lines at a plurality of frequencies for the signal received on the reference channel.

12. The system of claim 11, wherein the interferometer is configured to generate a threshold value to be applied to the spectral lines.

13. The system of claim 8, wherein generating an angle-of-arrival includes determining a signal arrival orientation value.

14. The system of claim 8, further including a third receiver receiving the signal at a third antenna, wherein the interferometer is configured to determine an emitter point along the angle-of-arrival.

15. A method for determining an angle-of-arrival for a detected signal, comprising:
    receiving the signal at a first antenna;
    receiving the signal at a second antenna;
    generating a plurality of spectral lines based on a complex multiplication of a complex conjugation of the signal received at the first antenna and the signal received at the second antenna;
    generating a delta phase difference for pairs of the spectral lines using frequency differences;
    resolving a phase ambiguity associated with the pairs, wherein the phase ambiguity is resolved by computing an ambiguity difference using a slope of the delta phase difference computed at least two distinct frequencies, the slope of the delta phase difference being with respect to a frequency difference; and
    generating an angle-of-arrival for the detected signal based on an average of the delta phase difference.

16. The method of claim 15, further including generating a threshold value to be applied to the spectral lines.

17. The method of claim 15, wherein generating an angle-of-arrival includes determining a signal arrival orientation value.

18. The method of claim 15, further including receiving the signal at a third antenna to determine an emitter point along the angle-of-arrival.

19. The method of claim 15, where in the pairs are within a frequency constraint.

20. The method of claim 15, wherein the phase ambiguity is compensated for when $N_{D0}-N_{D1}$ is not equal to zero, where $N_{D0}$ is the number of times of passing through $2\Pi$ at frequency 0 and $N_{D1}$ is the number of times of passing through $2\Pi$ at frequency 1.

* * * * *